2,972,627

Patented Feb. 21, 1961

2,972,627

SUBSTITUTED BENZYLESTERS OF SUBSTITUTED BENZYLDITHIOCARBAMIC ACIDS

David L. Garmaise and George Eric Just, Montreal, Quebec, and Arthur F. McKay, Beaconsfield West, Quebec, Canada, assignors to Monsanto Canada Limited, La Salle, Quebec, Canada No Drawing. Filed Dec. 22, 1958, Ser. No. 781,943

Claims priority, application Great Britain Mar. 3, 1958

1 Claim. (Cl. 260—455)

This invention relates to bacteriostatic compositions having as an active constituent a substituted benzylester of a substituted benzyldithiocarbamic acid of the general formula

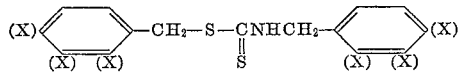

wherein X is a member of the group consisting of hydrogen, chlorine and nitro and at least one X on each ring is selected from the group consisting of chlorine and nitro.

Many bacteriostatic agents are known which have high activity against gram-positive organisms, but usually such agents are ineffective against gram-negative organisms including fungi. Compounds which are effective against both gram-positive and gram-negative organisms are much rarer.

The compositions of the invention containing the substituted benzyldithiocarbamic acid substituted benzylesters defined are effective bacteriostat agents against both gram-positive and gram-negative organisms.

They are particularly active in inhibiting the growth of gram-positive organisms, including *Staphylococcus pyogenes* (R) and (S), *Sarcina lutea* and *Strept. faecalis*. The most active member of the series is 4-chlorobenzyl 3,4-dichlorobenzyldithiocarbamate, which inhibits the growth of *M. pyogenes* var. *aureus* ATCC 6533 at a dilution greater than 1:10,000,000. The 3,4-dichlorobenzyl substituent was found to be more effective when attached to the nitrogen atom rather than the sulfur atom. The nitro-substituted dithiocarbamates are less effective against gram-positive organisms than the chlorine-substituted analogues, but tend to show greater activity against certain gram-negative organisms. Thus 3,4-dichlorobenzyl 4-nitrobenzyldithiocarbamate inhibits *Poteus mirabilis* at 1:640,000 and *Proteus vulgaris* at 1:160,000. These compounds showed fungicidal activity when evaluated against *Candida albicans*, *Microsporum gypseum* and *Trichophytum granulosum*.

The invention contemplates bringing the active substances into contact with the bacteria and for most practical applications the benzyldithiocarbamic acid substituted benzylesters defined are combined in minor amounts with major amounts of a suitable carrier to provide a practical bacteriostatic product. Preferred products are soap formulations which are prepared by incorporating from about 0.5% to about 3% by weight of the active substance into soap. For example, a germicidal liquid soap formulation can be made by incorporating from about 5 to about 20% by volume of the active substance in hot ethanol and adding the mixture, with thorough mixing, to a cold soap solution. The soap solution may be prepared by dissolving from about 10 to about 30 parts of clear potash soap (from the saponification of coconut oil with potash) in 100 parts of hot water.

A germidical bar soap may be made by adding from about 1 to about 3% by weight of an active substance of the invention to a manufactured soap containing a high proportion of coconut oil fatty acids. It is mixed with the soap along with and at the same stage as the perfume and colouring ingredients.

The bacteriostatic activity of the active substances described is not diminished by the presence of the soap so that these active substances are extremely effective in soap formulations.

The benzyl benzyldithiocarbamates are useful also in preserving surface coatings from attack by bacteria and fungi. The addition of 0.01 to 3% by weight of the described benzyl benzyldithiocarbamate to a latex paint or oil emulsion paint containing protein will preserve it from bacterial and fungal degradation.

Generally speaking, where the active substance is used merely to subdue the growth of fungi within the paint, amounts within the lower end of the range will usually be effective. Where, on the other hand, it is desired that the active substance will act when the paint is laid down as a film, usually the amount used is within the higher end of the range.

The term "carrier" is used, in this application, to define a vehicle which accompanies the active benzyl benzyldithiocarbamate of the invention, the carrier serving as a medium for conveying or distributing the active substance into contact with microorganisms against which it is designed to act. The carrier may be made up of a plurality of substances, as in the case of a soap formulation or a paint, and such carrier substances may have their own activity, as for example, the soap constituents in their cleaning function and the paint constituents in their covering function, or the carrier may even include other agents effective against microorganisms, or inert constituents. An essential function of the carrier, for the purposes of the present invention, is that it forms with the benzyl benzyldithiocarbamate active substance described a new composition of matter effective bacteriostatically, the carrier serving to convey or distribute the active substance into contact with the organisms it is designed to combat.

A preferred method of making these substituted benzylesters of substituted benzyldithiocarbamic acids is to treat a substituted benzylamine of the formula

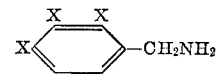

wherein X is a member of the group consisting of hydrogen, chlorine, and nitro, and at least one X is selected from the group consisting of chlorine and nitro, with carbon disulphide and a tertiary amine, for example triethylamine, in an inert solvent, for example, ether, petroleum ether, or benzene. Chloroform also can be used but the triethylamine salt of the dithiocarbamate does not precipitate in the presence of chloroform. The isolation of the salt is therefore omitted when chloroform is used. The temperature range in which this treatment is preferably carried out is from about —10° C. to about 30° C., desirably around —10° C. The amine salt of the benzyldithiocarbamic acid may then be separated by filtration. The salt is heated, preferably from about 20° C. to about 80° C., under reflux with a solution of a substituted benzyl chloride in a hydroxylic solvent, for example, methanol, ethanol or isopropanol. The reaction proceeds slowly at room temperature and the upper temperature limit depends on the stability of the dithiocarbamate. The solution is evaporated, and the residue is extracted with ether. The ether extract is washed with dilute acid, dilute alkali and water. After drying over sodium sulfate, the ether is evaporated and the product is obtained by crystallization of the residue.

For the purpose of explaining the invention in more detail, reference will now be made to the accompanying examples which illustrate preferred methods of preparation of the active substances and of the formulation of the active substances into compositions of matter of a preferred nature which exemplify the use of the active substances with a carrier.

EXAMPLE I

*2,4-dichlorobenzyl 4-chlorobenzyldithiocarbamate*

Carbon disulfide (8 parts) was added to a solution of 4-chlorobenzylamine (14.2 parts) and triethylamine (10.1 parts) in 70 parts diethyl ether at −10° C. over a period of 10 minutes. The crystalline precipitate of the triethylamine salt of 4-chlorobenzyldithiocarbamic acid (29.5 parts, 93% yield), melting at 113° C. (dec.) was separated by filtration. The salt (23.2 parts) was refluxed with a solution of 2,4-dichlorobenzyl chloride (14.3 parts) in 24 parts methanol for 5 minutes. The solution was evaporated to dryness in vacuo, and the residue was extracted with 300 parts ether. The ether solution was washed with 2% hydrochloric acid (3 x 100 parts), 2% sodium hydroxide solution (3 x 100 parts) and water (2 x 100 parts). The ether solution was concentrated to 40 parts, and 280 parts hexane was added, giving the crystalline product (24 parts, 87.5% yield) melting at 81–82.5° C. The product was recrystallized from 10 parts ether-hexane (1:10) to give the analytical sample melting at 83–84° C. Analysis of this new compound gave 48.22% carbon, 3.39 hydrogen, 27.94% chlorine, 3.95% nitrogen and 16.33% sulfur as compared with the theoretical calculated for $C_{15}H_{12}Cl_3NS_2$ of 47.71% carbon, 3.21% hydrogen, 28.23% chlorine, 3.72 nitrogen and 17.02% sulfur.

EXAMPLE II

*3,4-dichlorobenzyl 4-chlorobenzyldithiocarbamate*

The triethylamine salt of 4-chlorobenzyldithiocarbamic acid (Example I) was treated with 3,4-dichlorobenzyl chloride by the procedure outlined in Example I to give the product in 88.9% yield. The product was recrystallized from heptane-ether to give an analytically pure sample melting at 87–88° C. Analysis of the new compound gave 48.01% carbon, 3.30% hydrogen, 28.05% chlorine, 3.62% nitrogen and 17.06% sulfur as compared with the theoretical calculated for $C_{15}H_{12}Cl_3NS_2$ of 47.81% carbon, 3.21% hydrogen, 28.23% chlorine, 3.72% nitrogen and 17.02 sulfur.

EXAMPLE III

*4-chlorobenzyl 2,4-dichlorobenzyldithiocarbamate*

2,4-dichlorobenzylamine was converted by the procedure outlined in Example I to the triethylamine salt of 2,4-dichlorobenzyldithiocarbamic acid, M.P. 122–123.5° C. (dec.) in 91% yield. Treatment of the salt with 4-chlorobenzyl chloride as described in Example I afforded the product in 78.5% yield. Recrystallization from 10 parts ether-hexane (1:10) gave the analytical sample melting at 81° C. Analysis of this new compound gave 47.93% carbon, 3.31% hydrogen, 28.23% chlorine, 4.03 nitrogen and 16.79% sulfur as compared with the theoretical calculated for $C_{15}H_{12}Cl_3NS_2$ of 47.81% carbon, 3.21% hydrogen, 28.23% chlorine, 3.72% nitrogen and 17.02% sulfur.

EXAMPLE IV

*2,4-dichlorobenzyl 2,4-dichlorobenzyldithiocarbamate*

The triethylamine salt of 2,4-dichlorobenzyldithiocarbamate (Example III) was treated with 2,4-dichlorobenzyl chloride as described in Example I to give the product in 90% yield. The product was recrystallized from 10 parts ether-hexane (1:10) to give the analytical sample melting at 71.5° C. Analysis of the new compound gave 43.76% carbon, 3.02% hydrogen, 33.80% chlorine, 3.91% nitrogen and 15.20% sulfur as compared with the theoretical calculated for $C_{15}H_{11}Cl_4NS_2$ of 43.82% carbon, 2.70% hydrogen, 34.49% chlorine, 3.41% nitrogen and 15.59% sulfur.

EXAMPLE V

*3,4-dichlorobenzyl 2,4-dichlorobenzyldithiocarbamate*

The triethylamine salt of 2,4-dichlorobenzyldithiocarbamate (Example III) was treated with 3,4-dichlorobenzyl chloride as described in Example I to give the product melting at 58–59° C., in 77.3% yield. Analysis of this new compound gave 43.89% carbon, 2.80% hydrogen, 34.35% chlorine, 3.50% nitrogen and 15.38% sulfur as compared with the theoretical calculated for $C_{15}H_{11}Cl_4NS_2$ of 43.82% carbon, 2.70% hydrogen, 34.49% chlorine, 3.41% nitrogen, and 15.59% sulfur.

EXAMPLE VI

*4-chlorobenzyl 3,4-dichlorobenzyldithiocarbamate*

Carbon disulfide (12.5 parts) was added to a solution of 3,4-dichlorobenzylamine (26.4 parts) and triethylamine (21.8 parts) in ether (120 parts). The temperature was maintained at −10° C. during the addition period of 10 minutes. The crystalline precipitate of the triethylamine salt of 3,4-dichlorobenzyldithiocarbamic acid (50.2 parts, 94.6% yield) was separated by filtration. The salt was treated with 4-chlorobenzyl chloride as described in Example I to give the product in 63% yield. Recrystallization from dilute methanol afforded a pure sample melting at 60–61° C. Analysis of this new compound gave 47.56 % carbon, 3.27% hydrogen, 27.80% chlorine, 3.35% nitrogen and 16.82% sulfur as compared with the theoretical calculated for $C_{15}H_{12}Cl_3NS_2$ of 47.81% carbon, 3.21% hydrogen, 28.32% chlorine, 3.72% nitrogen, and 17.02% sulfur.

EXAMPLE VII

*2,4-dichlorobenzyl 3,4-dichlorobenzyldithiocarbamate*

The triethylamine salt of 3,4-dichlorobenzyldithiocarbamic acid (Example VI) was treated with 2,4-dichlorobenzyl chloride as described in Example I to give the product in 84.5% yield. Recrystallization from heptane yielded the analytical sample melting at 84.5–85° C. Analysis of this new compound gave 44.07% carbon, 2.79% hydrogen, 33.95% chlorine, 3.62% nitrogen and 15.23% sulfur as compared with the theoretical calculated for $C_{15}H_{11}Cl_4NS_2$ of 43.82% carbon, 2.70% hydrogen, 34.49% chlorine, 3.41% nitrogen and 15.59% sulfur.

EXAMPLE VIII

*3,4-dichlorobenzyl 3,4-dichlorobenzyldithiocarbamate*

The triethylamine salt of 3,4-dichlorobenzyldithiocarbamic acid (Example VI) was treated with 3,4-dichlorobenzyl chloride as described in Example I to give the product in 68.8% yield. Recrystallization from isopropanol yielded the analytical sample melting at 81–82° C. Analysis of the new compound gave 44.06% carbon, 3.06% hydrogen, 34.10% chlorine, 3.78% nitrogen and 15.33% sulfur as compared with the theoretical calculated for $C_{15}H_{11}Cl_4NS_2$ of 43.82% carbon, 2.70% hydrogen, 34.49% chlorine, 3.41% nitrogen and 15.59% sulfur.

EXAMPLE IX

*4-chlorobenzyl 4-nitrobenzyldithiocarbamate*

4-nitrobenzylamine was converted by the procedure outlined in Example I to the triethylamine salt of 4-nitrobenzyldithiocarbamic acid, M.P. 83–85° C., in 78% yield. Treatment of the salt with 4-chlorobenzyl chloride as described in Example I gave the product in 68.5% yield. Recrystallizations from 20 parts ethanol afforded the analytical sample melting at 137–137.5. Analysis of the new compound gave 51.04% carbon, 3.82% hydrogen, 9.34% chlorine, 8.04% nitrogen and 17.78% sulfur as compared with the theoretical calculated for $$C_{15}H_{13}ClN_2O_2S_2$$

of 51.05% carbon, 3.71% hydrogen, 10.05% chlorine, 7.94% nitrogen and 18.17% sulfur.

EXAMPLE X

*2,4-dichlorobenzyl 4-nitrobenzyldithiocarbamate*

The triethylamine salt of 4-nitrobenzyldithiocarbamic acid (Example IV) was treated with 2,4-dichlorobenzyl chloride by the procedure outlined in Example I to give the product in 69% yield. Recrystallization from 20 parts ethanol afforded the analytical sample melting at 117–117.5° C. Analysis of the new compound gave 46.60% carbon, 3.32% hydrogen, 17.73% chlorine, 7.56% nitrogen and 15.87% sulfur as compared with the theoretical calculated for $C_{15}H_{12}Cl_2N_2O_2S_2$ of 46.52% carbon, 3.12% hydrogen, 18.31% chlorine, 7.24% nitrogen and 16.56% sulfur.

EXAMPLE XI

*3,4-dichlorobenzyl 4-nitrobenzyldithiocarbamate*

The triethylamine salt of 4-nitrobenzyldithiocarbamate (Example IV) was treated with 3,4-dichlorobenzyl chloride by the procedure outlined in Example I to give the product in 73.5% yield. Recrystallization of the product from 15 parts methanol gave the analytical sample melting at 103.5° C. Analysis of this new compound gave 46.35% carbon, 3.13% hydrogen, 17.65% chlorine, 7.27% nitrogen and 16.02% sulfur as compared with the theoretical calculated for $C_{15}H_{12}Cl_2N_2O_2S_2$ of 46.52% carbon, 3.12% hydrogen, 18.31% chlorine, 7.24% nitrogen and 16.56% sulfur.

EXAMPLE XII

*4-nitrobenzyl 3,4-dichlorobenzyldithiocarbamate*

The triethylamine salt of 3,4-dichlorobenzyldithiocarbamic acid (Example VI) was treated with 4-nitrobenzyl chloride as described in Example I, except that chloroform was used instead of ether as the extracting solvent. The crude product was recrystallized from ethanol to give a 76.5% yield of the product melting at 149–150° C. Analysis of the new compound gave 46.29% carbon, 3.92% hydrogen, 18.18% chlorine, 7.44% nitrogen and 16.31% sulfur as compared with the theoretical calculated for $C_{15}H_{12}Cl_2N_2O_2S_2$ of 46.52% carbon, 3.12% hydrogen, 18.31% chlorine, 7.24% nitrogen and 16.56% sulfur.

EXAMPLE XIII

*Germicidal liquid soap formulation*

A solution of 4-chlorobenzyl 3,4-dichlorobenzyldithiocarbamate (100 parts) in 500 parts by volume of hot ethanol (95%) is added with thorough mixing to cold soap solution (10,000 parts by volume). The soap solution is prepared by dissolving 2,000 parts of clear potash soap (from the saponification of coconut oil with potash) in 8,000 parts of hot water.

EXAMPLE XIV

*Germicidal bar soap*

A substituted benzyl substituted benzyldithiocarbamate is added at a level of 2% by weight to a manufactured soap containing a high proportion of coconut oil fatty acids. It is mixed with the soap along with (and at the same stage as) the perfume and colouring ingredients.

EXAMPLE XV

*Latex paint*

| | Weight percent |
|---|---|
| Titanox RCHT | 47.4 |
| 4-chlorobenzyl 3,4-dichlorobenzyldithiocarbamate | 0.09 |
| Butadiene-styrene copolymer latex (55% solids) | 23.0 |
| 15% starch solution | 20.4 |
| "Igepol CTA" (33% solids) | 1.4 |
| Water | 7.6 |
| Antifoam agent | 0.006–0.01 |

The pigment is mixed with the 15% starch solution after which "Igepol CTA" and enough water are added and mixed to give a suitable paste. The remaining ingredients are then mixed to give the finished latex emulsion paint.

EXAMPLE XVI

*Exterior flat paint*

Solutions I and II are prepared separately and then mixed slowly to give an emulsion.

SOLUTION I

| | Weight percent |
|---|---|
| Ester gum | 33.8 |
| Kettle bodied linseed oil (viscosity of 24 to 26) | 28.0 |
| Pine oil | 23.0 |
| Cobalt naphthenate (6% Co) | 0.6 |
| Lead naphthenate (6% Pb) | 1.5 |
| Fatty acids from bodied linseed oil | 13.1 |

SOLUTION II

| | |
|---|---|
| Casein | 5.8 |
| 3,4-dichlorobenzyl 3,4-dichlorobenzyldithiocarbamate | 0.1 |
| 2-amino-2-methyl-1-propanol | 2.2 |
| Water | 91.8 |

Solution I is formulated by melting the ester gum with the linseed oil in a kettle and then adding the pine oil, fatty acids and driers. The resulting varnish is thoroughly mixed to a homogeneous liquid.

In the preparation of Solution II casein is added to water at room temperature with constant stirring. 2-amino-2-methyl-1-propanol and 3,4 - dichlorobenzyl 3,4-dichlorobenzyldithiocarbamate are added and the agitated formula is heated to 180° F.

The emulsion (42% by weight) from the mixing of solutions I and II is then mixed with 58% by weight of pigment, 90% lithopone and 10% diatomite, and the mixture is milled in a roller mill.

EXAMPLE XVII

*Semigloss latex paint*

| | Percent by weight |
|---|---|
| Pigment dispersion: | |
| Titanium dioxide | 21 |
| Lithopone | 6 |
| Mica | 3 |
| Water | 10 |
| Triton R100 | 0.07 |
| Tetrasodium pyrophosphate | 0.15 |
| Soya protein solution: | |
| Soya bean protein | 1.90 |
| Water | 10.26 |
| Ammonium hydroxide (26° Bé.) | 0.19 |
| 4 - chlorobenzyl 3,4 - dichlorobenzyldithiocarbamate | 0.065 |
| Thickener solution: | |
| Sodium alginate | 0.1 |
| Water | 4.87 |
| 4 - chlorobenzyl 3,4 - dichlorobenzyldithiocarbamate | 0.006 |
| Latex solution: | |
| Butadiene—styrene copolymer latex solution (55% solids) | 32.7 |
| Water | 9.69 |

After thoroughly grinding the pigment dispersion, the other solutions are mixed slowly with the dispersion to form the emulsion paint.

We claim:
4-chlorobenzyl 3,4-dichlorobenzyldithiocarbamate.

References Cited in the file of this patent

UNITED STATES PATENTS 2,561,208  Kirk _____ July 17, 1951

FOREIGN PATENTS 760,432  Great Britain _____ Oct. 31, 1956

OTHER REFERENCES

Sykes: Jour. Chem. Society (London) (1955), pgs. 2390–2394.